May 15, 1962  SHOJI TSUCHIYA  3,035,225
DIRECTIONAL COUPLER

Filed May 4, 1959  2 Sheets-Sheet 1

INVENTOR.
SHOJI TSUCHIYA
BY
Joseph Weingarten
ATTORNEY

United States Patent Office 3,035,225
Patented May 15, 1962

3,035,225
DIRECTIONAL COUPLER
Shoji Tsuchiya, Suginami-ku, Tokyo, Japan, assignor to Nippon Telegraph & Telephone Public Corporation, Tokyo, Japan, a Japanese firm
Filed May 4, 1959, Ser. No. 810,799
Claims priority, application Japan May 13, 1958
8 Claims. (Cl. 324—58)

The present invention relates in general to a new and useful instrument for measuring impedance over a broad band of frequencies and has particular reference to a phase directional coupler for use in an impedance measuring system.

The methods known hitherto for measuring and determining the complex impedance in a waveguide circuit at microwave frequencies (1,000 to 20,000 mc.), directly on a Smith Chart, are either a so-called electrical method or a method in which electrical and mechanical devices are employed in combination. As to the former, the installation is necessarily of large size and is not readily transportable because of its bulk, while the latter is inconvenient because of its servo- and rotation mechanism. These methods do not provide satisfactory performance as to their accuracy and reliability. In addition, the narrowness of their frequency range limits their utility. With these methods it is impossible to read impedance directly with great accuracy when sweeping a wide range of frequencies by means of a sweep oscillator. The rapid progress of technology in the field of telecommunication now requires a new method by which an exact measurement of complex impedances (transfer functions) over a broad band of frequencies and a direct reading of the complex impedances can be obtained.

It is an object of the present invention to meet that requirement. The device, according to the invention, consists of two rectangular waveguides that intersect each other at right angles so that their broad walls form a common quadrilateral portion. On the diagonal of the contacting surfaces, there is provided a coupling slot. The novel impedance measuring system includes a special waveguide coupler having a rotating coupling slot, a square law detector, a band pass filter, a low frequency amplifier and a cathode ray tube indicator. The coupling coefficient of the special waveguide coupler has no frequency characteristic so that when the coupler is employed for the detection of standing waves, it is free from error over a broad frequency band. In consequence, when the measuring system is combined with a sweep oscillator, the assemblage serves as a direct reading precision instrument for measuring impedance over a broad band, and in the area ±10% of the center of a predetermined frequency, its error of reflection coefficient and measurement of phase is less than ±0.3%.

The salient features of the above described coupler are that the coupling slot is arranged to rotate at high speed, the detector is fixed in the coupler, the degree of mismatching does not lead to errors, the disturbance introduced in the measured circuit is kept at a minimum, and adjustments are not critical. The coupler is easy to assemble, and it is compact and, therefore, easily transported.

The invention will be described in detail with reference to the accompanying drawings wherein.

Figure 1:
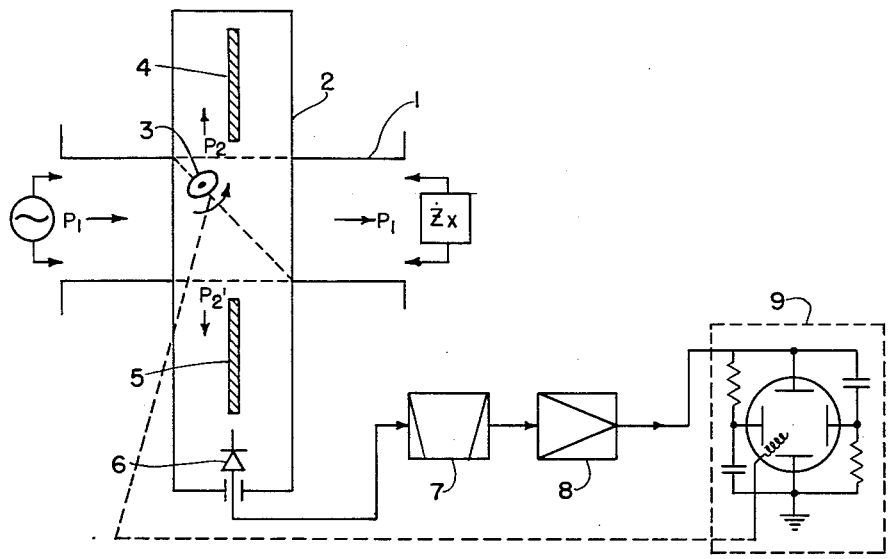
FIG. 1 shows a schematic arrangement of a preferred embodiment of the invention.

Referring now to FIG. 1 of the drawing, 1 represents the primary waveguide which has a high frequency power source coupled to one port and an object whose impedance is to be measured coupled to the other port. The secondary waveguide 2 intersects waveguide 1 at right angles with their broad wall surfaces in contact. The coupling slot 3 is disposed on a diagonal of the contacting common surfaces and connects the primary and secondary waveguides. The slot is arranged to rotate around its center of symmetry, being driven by means of a motor at a certain speed. A reflectionless termination 4 is provided for absorbing electric waves and reflected waves produced by mismatching of detector 6. The standing wave ratio of the detector is made negligible through this arrangement. A resistive attenuator 5 is provided in the waveguide 2 in order to compensate for the frequency characteristic of the coupling coefficient of the coupling slot. The effect of the attenuators is such that when the frequency goes up, the degree of attenuation too rises to compensate for the change in the coupling coefficient, because the degree of coupling is, to some extent, frequency dependent (the higher the frequency becomes, the greater the degree of coupling) in consequence of the attenuation characteristic caused by the resonance and the wall thickness of the slot. A square law detector, designated 6, is provided for detecting output power. The detector 6 may be a mineral detector or thermistor or the like. A band filter 7, whose center frequency is a frequency twice the revolution frequency of the slot, is coupled to the output of the detector. By means of this band filter, errors caused by the coupling of electric field components between the primary and secondary waveguides, errors arising from the shift that results from the square law characteristics of the detector, and errors caused by sweeping a broad band of frequencies are eliminated. An A.C. amplifier 8 is shown, the amplifier being arranged to operate along a linear portion of its plate current-plate voltage characteristic curve. An oscilloscope 9 is coupled to the output of amplifier 8. Impedance can be read directly on the cathode ray tube of the scope by impressing a portion of the output of amplifier 8 on the vertical deflection plates, impressing a portion of the amplifier's output which has been shifted in phase by 90° on the horizontal deflection plates, thus producing a rotating electric field, and periodically applying to the cathode ray tube's control grid a positive pulse of very short duration, the periodic pulses being synchronized relative to the rotation of the coupling slot so that two pulses occur during each revolution of the slot. The periodic pulses modulate the intensity of the beam of the tube. During the application of a pulse, the beam causes the phosphors on the tube's face to fluoresce brightly whereby the impedance under test is represented as bright spots on the fluorescent tube.

Figure 3:
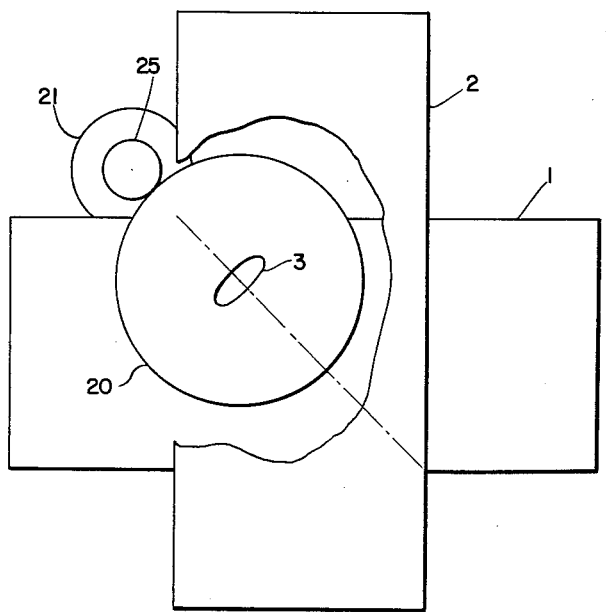
FIG. 3 is a view in which the upper waveguide has been broken away to show the rotatable disc.

FIG. 3 depicts the manner in which the coupling slot 3 is arranged to rotate about its geometric center. The coupling slot is an aperture in a disc 20, the disc forming a part of the partition between the upper waveguide 2 and the lower waveguide 1. The disc is set into the waveguides so that it can rotate. A motor 21 is provided to drive the disc to cause the coupling slot to rotate about the slot's geometric center. The rotor of motor 21 has keyed to it a hub 25 which bears upon the periphery of disc 20 and provides a frictional drive to that disc. Both the hub 25 and disc 20 may be provided with meshing gear teeth if a positive "slipless" drive is desired. It is important that the disc should not slip relative to the driving hub, since the synchronizing pulses from the pulse generator ought to occur 180° apart during each revolution of the disc.

Figure 4:
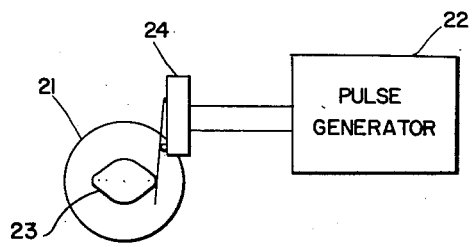
FIG. 4 depicts the manner of deriving intensity modulating pulses in synchronism with the rotation of disc.

Pulse generator 22, shown in FIG. 4, has its output pulses synchronized with the rotation of the shaft of motor 21 so that two pulses occur during each full revolution of the shaft. In order to have the pulses appear 180° apart relative to the shaft's rotation, a cam 23 is fixed to the motor's shaft, the cam having two opposite lobes. Upon rotation of the motor's shaft, the cam lobes alternately close switch 24 whereupon the pulse generator is triggered and delivers one pulse of brief duration for each closing of the switch.

As to the form of coupling slot, an elliptical slit or dumbbell shape is preferred for the purpose of inhibiting electric field coupling while permitting coupling by the magnetic field only.

The most important point of this invention lies in the proper combination of the special waveguide coupler and the band filter 7.

Figure 2:
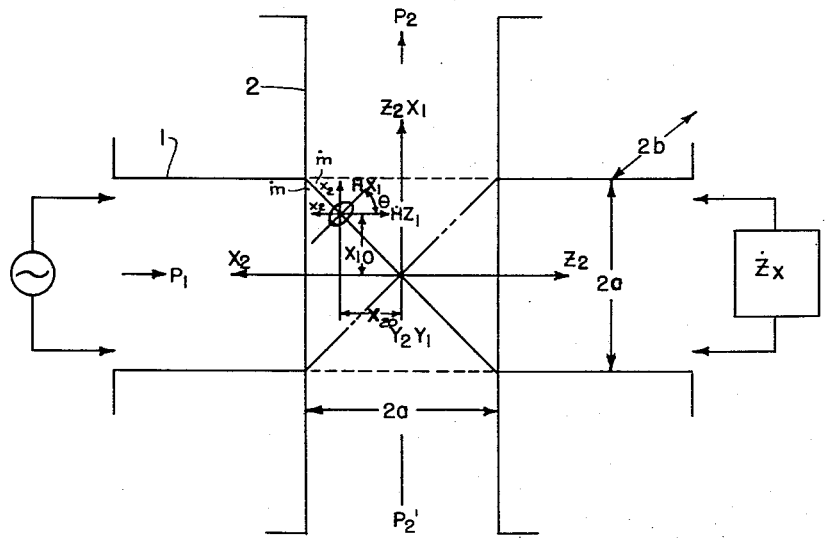
FIG. 2 is an enlarged view of the waveguide coupler shown in FIG. 1.

It will now be explained how the circuit arrangement operates as an instrument for accurately indicating impedance over a broad range of frequencies. The operation of the special waveguide coupler part, which is the main part of this circuit arrangement, will be explained in detail with reference to FIG. 2 of the drawings. The dimensions of the primary and secondary waveguides are fixed, as shown in the drawings, where the width of the broad and narrow walls of the waveguides are denoted by $2a$, $2b$, respectively (for the sake of simplicity, let both primary and secondary waveguides be of the same dimensions). The two waveguides intersect each other at right angle, their broad walls being in contact, and the coupling slot 3 being located so that its geometric center is on the diagonal of the rectangular intersection and the slot, lengthwise, is disposed transversely to the diagonal. So $x_{10}=x_{20}$. The value of the electromagnetic field at the center of the coupling slot when an $H_{01}$ wave is within the primary waveguide will be:

$$\left.\begin{aligned}\dot{E}_{x_1}=&-j\frac{\sqrt{\mu}\sqrt{P_1}}{\sqrt{ab}}\cdot\sqrt{\frac{\omega}{\beta}}(1+\dot{R})\sin\frac{\pi(x_{10}+a)}{2a}\operatorname{Exp}(j\omega t)\\ \dot{H}_{x_1}=&\ j\frac{\sqrt{P_1}}{\sqrt{\mu ab}}\cdot\sqrt{\frac{\beta}{\omega}}(1-\dot{R})\sin\frac{\pi(x_{10}+a)}{2a}\operatorname{Exp}(j\omega t)\\ \dot{H}_{z_1}=&\ \frac{\sqrt{P_1}}{\sqrt{\mu ab}}\cdot\left(\frac{\pi}{2a}\right)\frac{1}{\sqrt{\omega\beta}}(1+\dot{R})\cos\frac{\pi(x_{10}+a)}{2a}\operatorname{Exp}(j\omega t)\end{aligned}\right\} \quad (1)$$

where
$P_1$: electric power of the traveling wave in the primary waveguide
$\mu$: capacity of magnetic induction
$\omega=2\pi f$
$f$: frequency
$\beta=\dfrac{2\pi}{\lambda_g}$
$\lambda_g$: wave length in the waveguide
$\dot{R}$: reflection coefficient of voltage of load at the center of coupling slot
$\dot{R}=|R|\operatorname{Exp}(j\eta)$
Unit: MKS rationalized system of units When a coupling slot with a very narrow breadth and with a sufficient wall thickness is employed, the electric field coupling will be fairly small in comparison to the magnetic coupling and the electric field coupling stays constant regardless of $\theta$. Therefore coupling due to electric fields can be neglected as their effect is easily eliminated by the band filter 7, and only the magnetic couplings $\dot{H}_{x_1}$, $\dot{H}_{z_1}$ need be considered.

Further, with regard to the rate of polarization of the slot, only that of the longer axis is taken up and that of the shorter axis direction is disregarded.

Let the magnetic polarization of coupling be $M$, the angle between the direction of the longer axis of coupling slot and the axis $Z_1$ be $\theta$. The length of the coupling slot is short in comparison to $\lambda_g$. Then the primary magnetic field $\dot{H}_1$ that gives influence on the coupling slot will be as follows:

$$\dot{H}=\dot{H}_{x_1}\sin\theta+\dot{H}_{z_1}\cos\theta \quad (2)$$

Thus the strength of the magnetic dipole $\dot{m}_1$ is:

$$\dot{m}_1=M\dot{H}_1 \quad (3)$$

To obtain the magnetic field generated within the secondary waveguide through this $\dot{m}_1$, the directional components ($\dot{m}_{x_2}$, $\dot{m}_{z_2}$) of $m_1$ of the axis $x_2$ and axis $z_2$ are to be checked. Then it will be:

$$\left.\begin{aligned}\dot{m}=-\dot{m}_1\cos\theta=M(\dot{H}_{x_1}\sin\theta+\dot{H}_{z_1}\cos\theta)\cos\theta\\ \dot{m}=\dot{m}_1\sin\theta=M(\dot{H}_{x_1}\sin\theta+\dot{H}_{z_1}\cos\theta)\sin\theta\end{aligned}\right\} \quad (4)$$

Therefore the magnetic field and radiation power produced by this magnetic dipole within the secondary waveguide can be obtained by getting the function $g$ embodied in the function $\psi$ that determines the basic wave.

The value of the function $g$ will be in this case as follows:

$$\dot{g}=\dot{m}_{x_2}(\omega^2\epsilon\mu-\beta^2)\psi_{x_{20}}\pm j\beta\dot{m}_{x_2}\left(\frac{\partial\psi}{\partial x_2}\right)x_{20} \quad (5)$$

where $$\begin{cases}\psi=\cos\dfrac{\pi(x_2+a)}{2a}\text{ power function for }H_{01}\text{ wave}\\ \omega^2\epsilon\mu-\beta^2=\left(\dfrac{\pi}{2a}\right)^2\text{ proper value for }H_{01}\text{ wave}\\ \psi_{x_{20}}=\cos\dfrac{\pi(x_{20}+a)}{2a}\\ \left(\dfrac{\partial\psi}{\partial x_2}\right)x_2=-\left(\dfrac{\pi}{2a}\right)\sin\dfrac{\pi(x_{20}+a)}{2a}\\ \psi=\dfrac{\dot{g}\psi(x_{20}y_2)}{2j\beta\mu D(\psi)}\operatorname{Exp}[j\omega t\pm j\beta(z_2-z)]\end{cases} \quad (5')$$

Regarding the plus and minus signs, $+$ means the wave in the positive direction of $Z_2$, and $-$ represents the wave that is transferred in the negative direction.

When the powers to be radiated within the secondary waveguide are: $P_2$, $P'_2$, this can be obtained by the following formulas respectively:

$$P_2,\ P'_2=\frac{\omega|g(\pm)|^2}{8\mu\beta D(\psi)} \quad (6)$$

but $$D(\psi)=\int_{-a-b}^{ab}\left\{\left(\frac{\partial\psi}{\partial x_2}\right)^2+\left(\frac{\partial\psi}{\partial y^2}\right)^2\right\}dx_2dy_2=2ab\left(\frac{\pi}{2a}\right)^2$$

When (1), (4) and (5) are applied to (6), $P_2$, $P'_2$ can be worked out. But, for the sake of simplicity of calculations, and for making the frequency characteristic of $P'_2$ clear, a value as shown in the following is introduced.

Let the center frequency be $f_0$, and the wave length within the guide be $\lambda_{g_0}$ and suppose that the following formula stands:

$$\frac{\lambda_{g_0}}{4a}\cot\frac{\pi(x_2+a)}{2a}=-1 \quad (7)$$

but, $$x_2=x_{10}=x_{20}$$

then $$\delta = \frac{\lambda_g - \lambda_{g_0}}{\lambda_{g_0}} = \frac{\Delta \lambda_g}{\lambda_{g_0}} \quad (8)$$

and let $|\delta|<0.15$ and when the term of higher order than $|\delta|^3$ is neglected against (1):

$$\left.\begin{array}{l} \dfrac{\lambda_g}{4a} \cot \dfrac{\pi(x_0+a)}{2a} = 1+\delta \\[4pt] \dfrac{4a}{\lambda_g} \tan \dfrac{\pi(x_0+a)}{2a} = 1-\delta+\delta^2 \end{array}\right\} \quad (9)$$

Computing the Formula 6 by employing Formula 9 the following result is obtained (term of higher order than $$\frac{|\delta|^2}{2}$$

is neglected against (1):

$$P_2 = K|-j\{+\dot{R} \, \text{Exp} \, (-j2\theta - j\delta' \sin 2\theta)\}|^2 \cdot P_1$$

$$P'_2 = K|j \, \text{Exp} \, (j2\theta)\{1+R \, \text{Exp} \, (-j2\theta)$$
$$\qquad +j\delta'\dot{R} \sin 2\theta \, \text{Exp} \, (-j2\theta)\}|^2 P_1 \quad (10)$$

but $$\delta' = \delta\left(1-\frac{\delta}{2}\right)$$

Here K represents the coupling coefficient of coupling slot 3. Then:

$$10 \log_{10} K = 20 \log_{10} \frac{\pi M \sin \frac{\pi x_2}{a}}{1 \upsilon \mu a^2 b} \, (\text{db}) \quad (11)$$

and as the equation does not include a frequency term, it is evident that K is constant regardless of the frequency. Further, when $\dot{R}=|R| \, \text{Exp} \, (j\eta)$, by computing the $| \quad |^2$ of Formula 10, $P_2$, $P'_2$ are found to be of equal value and are as follows: (terms of higher order than $$\frac{|\delta|^2}{2}$$

is neglected against (1)

$$P_2 = P'_2 = K\{1+|R|^2+2|R| \cos (\eta-2\theta)$$
$$\qquad +\delta'|R| \cos \eta - \delta'|R| \cos (\eta-4\theta)\}P_1 \quad (12)$$

When the output and input characteristics of the wave detector 6 coupled to the secondary waveguide are square law characteristics, the type of output voltage is that of Formula 12.

Hence the output voltage $$v_2 = kP_2 = kP'_2 \quad (13)$$

where $k$ is a proportionality constant. It can be therefore discussed on the basis of Formula 12. Now, the quantity that comes into question is only that of the third term of Formula 12, since the first, second, fourth and fifth terms, which introduce errors because they include $\delta'$, are insignificant and can be eliminated from consideration.

When the coupling slot revolves, its frequency of revolution is $p$/sec., then:

$$\theta = 2\pi pt \quad (14)$$

Applying the condition of the Formula 14 to Formula 12, it is learned that when the high frequency power source is not swept, terms 1, 2, 4 of Formula 12 represent direct current components and the third term represents an alternating current component having a frequency of $2p$ and the fifth term represents an alternating current component having a frequency $4p$. In the case where the high frequency power source is swept, at a rate of $n$ times per second, the first term represents a direct current component, and the second and fourth terms represent A.C. components having frequencies $n$ and harmonics thereof, while the third term represents an A.C. component having $2p$ as its center frequency and the fifth term likewise represents an A.C. component having $4p$ as its center frequency and $n$ and higher harmonic waves in its side band.

Thus $$n \ll p \quad (15)$$

When the output is taken out through a band filter whose center frequency is $2p$ and having a pass band of $\pm 5$, for example, only the A.C. component represented by the third term of Formula 12 can be picked up in either case and all kinds of errors are eliminated.

Denoting this output by $V_0$, it is given by the formula:

$$V_0 = k \cdot K \cdot 2|R| \cos \{\eta - 2\pi \cdot 2pt\} P_1 \quad (16)$$

By employing the band pass filter, the terms which introduce errors because they include $\delta'$ are removed and at the same time, the errors arising from electric field coupling and the delay resulting from the square law characteristics of detector 6 are also eliminated. Because the errors arising from electric field coupling are constant regardless of $\theta$, those errors become a direct current component after detection. The delay resulting from the detector's square law characteristics results in a signal whose wave content includes a frequency of $2p$ and its higher harmonics. The direct current component and the harmonic content are removed by means of the filter. As it is understood from the Formulas 11 and 16, the equation for $V_0$ does not include the term of frequency $f$. Thus it is shown that the Formula 16 is valid regardless of the frequency $f$ of the microwave energy, though it is subject to the conditions of $|\delta|<0.15 \eta \ll p$. This is the reason why this wave coupler covers a broad band of frequencies.

The output $V_0$ of band pass filter 7 is fed into the linear amplifier 8 and the output of the amplifier is impressed on the vertical deflection plates of cathode ray tube 9, that tube being of the electrostatic deflection type. The horizontal deflection plates of tube 9 are connected by 90° phase shift networks to the output of amplifier 8. The deflection signals cause the electron beam of the tube to trace a circle on the tube's face, the circle having a radius proportional to the reflection coefficient 1R1.

Further, by generating a positive pulse of short duration each time $\theta$ passes through 0 and $\pi$, and employing the generated pulse to intensity modulate the cathode ray tube 9, it is possible to show the time $\eta = 2\pi \cdot 2pt$ at the moment when $\cos \{\eta - 2\pi \cdot 2pt\}$ reaches its maximum.

In this way the invention serves as an instrument for directly reading impedance, as $|R|$ and $\eta$ can be detected. As described above, there is almost no error over a broad frequency band and therefore the instrument is of high precision.

Another property of the waveguide coupler of this invention is, as it is understood from the Formula 10, the phase of the microwave energy in the $P_2$ side of the secondary wave guide 2, in the case of $R=0$, lags the phase of the energy in the primary guide 1 by 90° and the phase lag is constant (regardless of $\theta$). The phase of the wave energy in the $P'_2$ side of the guide 2, in contrast, leads the phase of the energy in the primary guide by 90° and revolves at the same time at the speed of $2\theta = 2\pi(2p)t$. The amplitude is constant and has no frequency characteristic in connection with the phase rotation. Terminating the $\dot{Z}_x$ side of the primary waveguide in a reflectionless termination and taking out the microwave energy in its original form, causes the waveguide coupler to become a microwave phase shifter which is accurate over a wide frequency range and is unaffected by amplitude modulation of the input signal.

Though the coupling coefficient, for the most part, is determined by the value of Formula 11, it is, practically, subject to resonance of the coupling slot and the effect of the slot's wall thickness and, therefore, is not entirely exempted from frequency characteristics. Taking these two facts into consideration, it is presumed that the coupling coefficient is:

$$K' = 10 \log_{10} K - 20 \log_{10}\left\{1 - \left(\frac{\lambda_g}{\lambda}\right)^2\right\} - \frac{54.6}{\lambda}\tau\sqrt{1-\left(\frac{\lambda_r}{\lambda}\right)^2} \quad (\text{db})$$

(17)

where:
$\lambda_r = 2l - 0.546d$
$l$: length of the coupling slot
$d$: width of the coupling slot
$\tau$: wall thickness of the coupling slot In Formula 17, the second and third terms are, in practice, from 1/20 to 1/30 of the first term, and in the range of $\lambda \gg \lambda_r$ their value decreases monotonically in proportion to the decrease of $\lambda$, and the second and third terms are completely compensated by inserting a resistance attenuator which is bestowed with inverse attenuation frequency characteristics. Such an attenuator is indicated by numeral 5 in FIG. 1. As the same result can be obtained by connecting the detector to either side of the secondary waveguide, it is connected to the $P'_2$ side in FIG. 1, and a reflectionless termination 4 is coupled to the opposite side for the purpose of absorbing $P_2$. The termination 4 also fulfills the function of absorbing waves reflected from the detector 6.

What is claimed is:

1. A directional coupler comprising first and second orthogonally disposed rectangular waveguides having a common broad wall quadrilateral partition, said partition including a rotatable disc having its axis of rotation in one quadrant of said partition and normal to the diagonal of said quadrilateral partition, a coupling slot in said disc arranged symmetrically on said diagonal, and means for rotating said disc to cause the coupling slot to turn about the slot's geometric center.

2. A directional coupler according to claim 1, in which the coupling slot in said disc has an elliptical configuration.

3. An impedance measuring system comprising a first rectangular wave guide, a source of microwave energy coupled to said first wave guide, a second rectangular wave guide, said first and second waveguides being orthogonally disposed and having a common broad wall rectangular partition, said partition including a rotatable disc having an elongate coupling slot arranged symmetrically on a diagonal of said rectangular partition, the rotatable disc upon revolving causing the coupling slot to turn about the slot's geometric center, reflectionless means disposed in said second waveguide and terminating one end thereof, the impedance subject to measurement being coupled to the first waveguide, the impedance being disposed so that microwave energy from the source propagates in the first waveguide across the partition toward the impedance, a detector in said second waveguide disposed adjacent the other end thereof, a bandpass filter, means coupling the output of said detector to said filter, a cathode ray tube having beam deflection apparatus, means coupling the output of said filter to said beam deflection apparatus, and pulse generating means for applying intensity modulating pulses to said cathode ray tube in synchronism with the rotation of said coupling slot.

4. An impedance measuring system as in claim 3, further including motor means for rotating said disc, and in which the center frequency of the aforesaid bandpass filter is twice the frequency of revolution of said disc.

5. An impedance measuring system as in claim 3, in which the means coupling the output of said filter to said beam deflection apparatus includes apparatus for introducing a 90° phase shift in a portion of the output of said filter whereby to produce a circular sweep in said cathode ray tube.

6. An impedance measuring system as in claim 3, further including a motor for causing rotation of said disc, and apparatus for synchronizing the generation of intensity modulating pulses by said pulse generating means with the rotation of the rotor of said motor.

7. A directional coupler comprising first and second orthogonally disposed rectangular waveguides having a common broad wall quadrilateral partition, the partition including rotatable means having an elongate slot therein coupling the first and second waveguides, the coupling slot being disposed in one quadrant of the partition and on a diagonal of the quadrilateral partition, and the rotatable means being arranged to cause the coupling slot to turn about the slot's geometric center.

8. A directional coupler comprising first and second orthogonally disposed rectangular waveguides having a common broad wall partition, the partition including rotatable means having an elliptical slot therein coupling the first and second waveguides, the coupling slot being disposed in one quadrant of the partition and on a diagonal of the partition, and the rotatable means being arranged to cause the elliptical slot to turn about the slot's geometric center.

References Cited in the file of this patent

UNITED STATES PATENTS

| | | |
|---|---|---|
| 2,541,375 | Mumford | Feb. 13, 1951 |
| 2,776,406 | Cohn et al. | Jan. 1, 1957 |
| 2,786,180 | Cohn | Mar. 19, 1957 |
| 2,870,419 | Riblet | Jan. 20, 1959 |
| 2,898,559 | Heinard et al. | Aug. 4, 1959 |